(12) United States Patent
Kim (10) Patent No.: US 11,640,082 B2
(45) Date of Patent: May 2, 2023

(54) BACKLIGHT UNIT AND DISPLAY DEVICE

(71) Applicant: LG DISPLAY CO., LTD., Seoul (KR)

(72) Inventor: KiSeong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 33 days.

(21) Appl. No.: 17/468,099

(22) Filed: Sep. 7, 2021

(65) Prior Publication Data

US 2022/0128866 A1    Apr. 28, 2022

(30) Foreign Application Priority Data

Oct. 26, 2020  (KR) .................. 10-2020-0139718

(51) Int. Cl.
*G02F 1/1335*    (2006.01)
*G02F 1/13357*   (2006.01)

(52) U.S. Cl.
CPC .. *G02F 1/133614* (2021.01); *G02F 1/133605* (2013.01); *G02F 1/133606* (2013.01)

(58) Field of Classification Search
CPC .. G02B 6/0026; G02B 6/0031; G02B 6/0051; G02B 6/0065; G02B 6/0068; G02F 1/133602; G02F 1/133603; G02F 1/133605; G02F 1/133606; G02F 1/133611; G02F 1/133614
See application file for complete search history.

(56) References Cited

U.S. PATENT DOCUMENTS

2007/0086211 A1*  4/2007 Beeson ............ H01L 33/60
                                              362/616
2018/0356685 A1  12/2018 Jang et al.
(Continued)

FOREIGN PATENT DOCUMENTS

| CN | 109001938 A | 12/2018 |
| CN | 109477617 A | 3/2019 |
| JP | 2018056367 A | 4/2018 |

(Continued)

OTHER PUBLICATIONS

Combined Search and Examination Report issued by the United Kingdom Patent Office corresponding to United Kingdom Patent Application No. 2113597.5, dated Feb. 18, 2022.

(Continued)

*Primary Examiner* — Britt D Hanley
(74) *Attorney, Agent, or Firm* — Morgan, Lewis & Bockius LLP (57) ABSTRACT

A backlight unit and a display device includes a plurality of light sources and a color conversion layer on a reflective layer, thereby removing expensive color conversion sheets and supplying high-quality white light. A backlight unit includes a printed circuit; light sources on the printed circuit; a reflective layer on at least a partial area of an area in which the light sources are not disposed on the printed circuit; a transparent film above the light sources and the reflective layer and spaced apart from the light sources and the reflective layer; light diffusion patterns on at least one of the top and bottom of the transparent film and corresponding to each of the light sources; a first color conversion layer on the reflective layer; and a second color conversion layer on at least one of a top surface and a bottom surface of the light diffusion patterns.

16 Claims, 11 Drawing Sheets

(56) References Cited

U.S. PATENT DOCUMENTS

2019/0146274 A1   5/2019   Kuniyasu et al.
2020/0183232 A1   6/2020   Kim et al.

FOREIGN PATENT DOCUMENTS

KR   10-2012-0078883 A   7/2012
TW        202024748 A   7/2020
WO       20170175858 A1  10/2017

OTHER PUBLICATIONS

Office Action issued in TW Patent Application. No. 110133708 dated Nov. 30, 2022.

* cited by examiner

FIG.7

BACKLIGHT UNIT AND DISPLAY DEVICE

CROSS REFERENCE TO RELATED APPLICATION

This application claims priority to Korean Patent Application No. 10-2020-0139718, filed on Oct. 26, 2020 in the Republic of Korea, which is hereby incorporated by reference in its entirety.

Technical Field

The present disclosure relates to a backlight unit and a display device.

Discussion of the Related Art

With the development of the information society, there has been an increasing demand for a variety of types of display devices. In this regard, various display devices, such as liquid crystal display (LCD) devices, and organic light-emitting diode (OLED) display devices, have recently come into widespread use.

Among such display devices, the liquid crystal display device may include a display panel and a backlight unit supplying light to the display panel. In addition, the display panel receiving light from the backlight unit may adjust the brightness of the subpixels disposed on the display panel and display an image corresponding to an image data.

In addition, when the backlight unit excites light of a specific wavelength band to supply white light, low light efficiency may increase power consumption or increase the manufacturing cost of the backlight unit, thereby being many difficulties to realize high luminance.

SUMMARY

Accordingly, embodiments of the present disclosure are directed to a backlight unit and a display device that substantially obviates one or more of the problems due to limitations and disadvantages of the related art.

An aspect of the present disclosure is to provide a backlight unit and a display device to improve halo characteristics.

Another aspect of the present disclosure is to provide a backlight unit and a display device to improve uniformity of white light emitted from a top surface thereof.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a backlight unit comprises a printed circuit, a plurality of light sources disposed on the printed circuit, a reflective layer disposed on at least a partial area of an area in which the plurality of light sources are not disposed on the printed circuit, a transparent film disposed above the plurality of light sources and the reflective layer and spaced apart from the plurality of light sources and the reflective layer, a plurality of light diffusion patterns disposed on at least one of the top and bottom of the transparent film and corresponding to each of the plurality of light sources, a first color conversion layer disposed on the reflective layer, and a second color conversion layer disposed on at least one of a top surface and a bottom surface of the plurality of light diffusion patterns.

In another aspect, a backlight unit comprises a printed circuit, a plurality of light sources disposed on the printed circuit, a transparent film disposed above the plurality of light sources and spaced apart from the plurality of light sources, a plurality of light diffusion patterns disposed on at least one of the top and bottom of the transparent film and corresponding to each of the plurality of light sources, a first color conversion layer disposed on at least a partial area among an area at which the plurality of light sources are not disposed, and a second color conversion layer disposed on at least one of a top surface and a bottom surface of the plurality of light diffusion patterns.

In another aspect, a display device comprises a display panel, and a backlight unit to supply light to the display panel. The backlight unit includes a printed circuit, a plurality of light sources disposed on the printed circuit, a transparent film disposed on the plurality of light sources and spaced apart from the plurality of light sources, a plurality of light diffusion patterns disposed on at least one of the top and bottom of the transparent film and corresponding to each of the plurality of light sources, a first color conversion layer disposed on at least a partial area among an area at which the plurality of light sources are not disposed, and a second color conversion layer disposed on at least one of a top surface and a bottom surface of the plurality of light diffusion patterns.

According to exemplary aspects, a backlight unit and a display device may improve the halo characteristics.

According to exemplary aspects, a backlight unit and a display device may improve uniformity of white light emitted from a top surface thereof.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, exemplary aspects will be described in detail with reference to the accompanying drawings.

Figure 1:
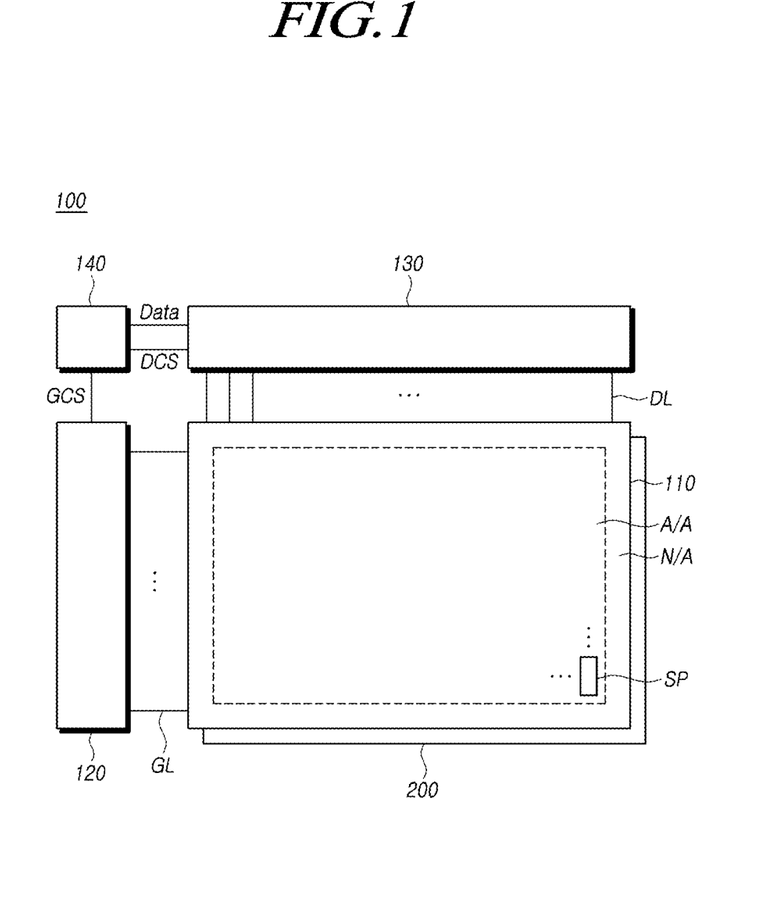
FIG. 1 illustrates a schematic configuration of a display device according to embodiments.

FIG. 1 illustrates a schematic configuration of a display device 100 according to embodiments of the present disclosure. All the components of the display device 100 according to all embodiments of the present disclosure are operatively coupled and configured.

Referring to FIG. 1, the display device 100 according to the embodiments of the present disclosure can comprise a display panel 110 including an active area A/A where a plurality of subpixels SP are disposed and a non-active area N/A which is disposed outside the active area A/A. Furthermore, the display device 100 can comprise a gate driving circuit 120, a data driving circuit 130, and a controller 140 for driving the display panel 110.

A plurality of gate lines GL and a plurality of data lines DL can be arranged on the display panel 110, and the plurality of subpixels SP can be disposed in the areas where the gate lines GL and the data lines DL intersect each other.

The gate driving circuit 120 is controlled by the controller 140, and sequentially outputs scan signals to a plurality of gate lines GL arranged on the display panel 110, thereby controlling the driving timing of a plurality of subpixels SP.

The gate driving circuit 120 can comprise one or more gate driver integrated circuits GDIC, and can be disposed only at one side of the display panel 110, or can be disposed at both sides thereof according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, the gate driver integrated circuit GDIC can be integrated and arranged on the display panel 110. In addition, each gate driver integrated circuit GDIC can be implemented by a chip-on-film COF method in which an element is mounted on a film connected to the display panel 110.

The data driving circuit 130 receives image data Data from the controller 140 and converts the image data Data into an analog data voltage. Then, the data driving circuit 130 outputs the data voltage to each data line DL according to the timing at which the scan signal is applied through the gate line GL so that each of the plurality of subpixels SP emits light having brightness according to the image data.

The data driving circuit 130 can comprise one or more source driver integrated circuits SDIC.

Each source driver integrated circuit SDIC can comprise a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, the source driver integrated circuit SDIC can be integrated and arranged on the display panel 110. In addition, each source driver integrated circuit SDIC can be implemented by a chip-on-film COF method in which each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 outputs various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further comprise a power management integrated circuit for supplying various voltages or currents to the display panel 110, the gate driving circuit 120, the data driving circuit 130, and the like or controlling various voltages or currents to be supplied thereto.

Each of the plurality of subpixels SP can be an area defined by the intersection of the gate line GL and the data line DL, and a liquid crystal or a light-emitting element can be disposed therein depending on the type of the display device 100.

For example, in the case that the display device 100 is a liquid crystal display device, the display device 100 can comprise a light source device such as a backlight unit 200 for emitting light to the display panel 110, and a liquid crystal can be disposed in the subpixel SP of the display panel 110. In addition, since the arrangement of the liquid crystal is adjusted by the electric field produced due to the data voltage applied to each subpixel SP, the brightness according to image data can be realized, thereby displaying images.

Figure 2:
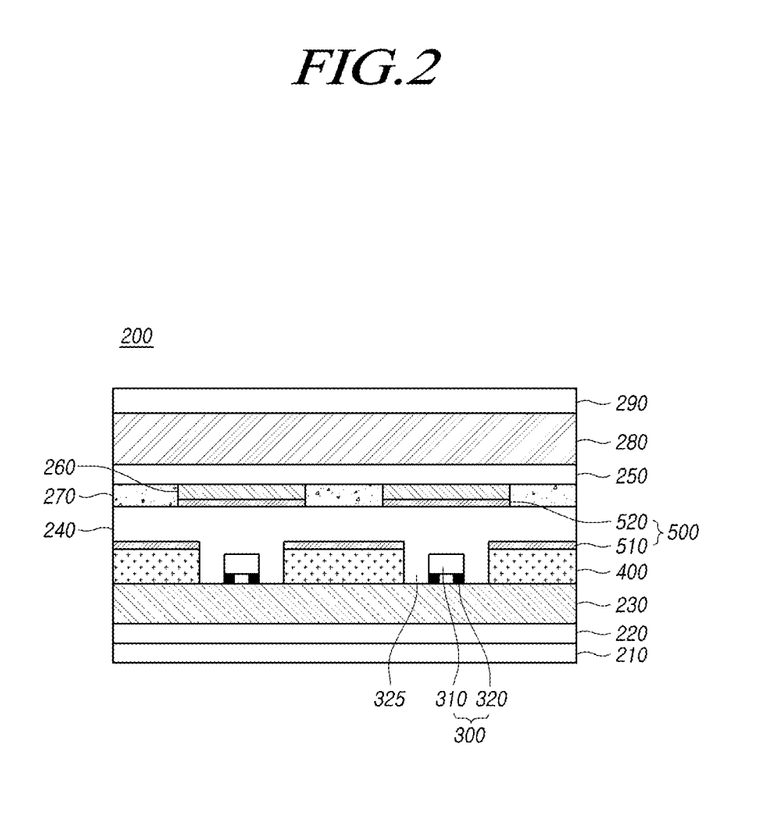
FIGS. 2 and 3 illustrate examples of the cross-sectional structure of a backlight unit included in a display device according to embodiments of the present disclosure.
Figure 3:
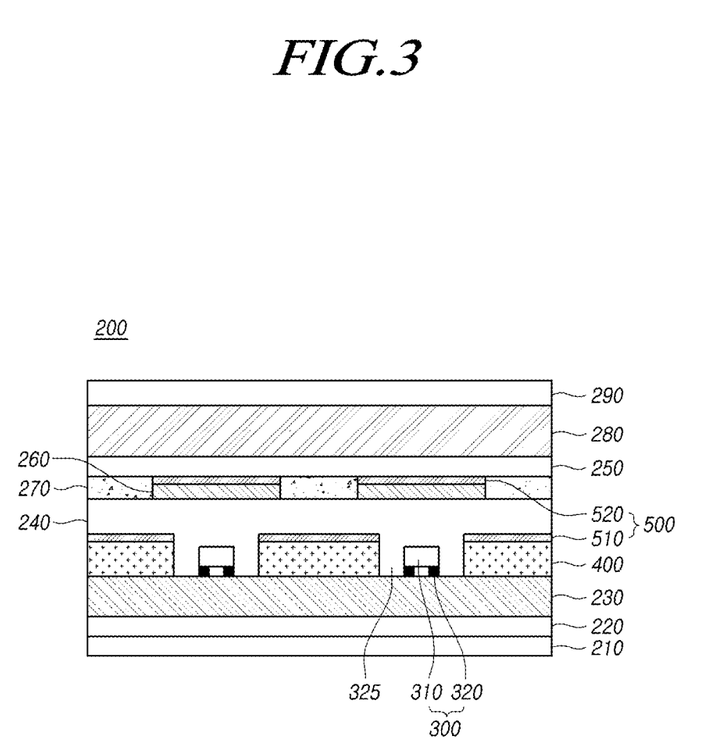

FIGS. 2 and 3 illustrate examples of the cross-sectional structure of a backlight unit included in a display device according to embodiments of the present disclosure.

Referring to FIGS. 2 and 3, a backlight unit 200 according to embodiments of the present disclosure may include a cover bottom 210 for accommodating light-emitting elements included in the backlight unit 200.

A printed circuit 230 may be attached to an adhesive tape 220 on the cover bottom 210. The printed circuit 230 may be disposed on the cover bottom 210 without the adhesive tape 220 or other element.

The printed circuit 230 may be in the form of a substrate. In addition, the printed circuit 230 may be a printed circuit board PCB, a flexible printed circuit board FPCB, a glass substrate, and the like.

A plurality of light sources 300 may be disposed on the printed circuit 230. The plurality of light sources 300 may be light-emitting diodes LEDs, and may be light-emitting diodes LEDs that emit light of a specific wavelength band. The plurality of light sources 300 may be various light sources such as organic light-emitting diodes OLEDs.

The light source 300 on the printed circuit 230 may include a light emitting portion 310 and an electrode portion 320 for driving the light emitting portion 310. The light emitting portion 310 of the light source 300 may include an n-type semiconductor layer, an activation layer, and a p-type semiconductor layer.

A reflective layer 400 may be disposed on at least a partial area of an area in which the plurality of light sources 300 are not disposed on the printed circuit 230. The reflective layer 400 includes a plurality of holes 325, and the light source 300 may be disposed in each of the plurality of holes 325. The holes 325 may have various shapes, such as a circle or a square. Hereinafter, the hole 325 is described as being a circular hole, but is not limited thereto.

The light source protection unit 240 may be disposed on the plurality of light sources 300 and the reflective layer 400. The light source protection unit 240 may protect the plurality of light sources 300 from external force and may diffuse light emitted from the light source 300.

That is, the light source protection unit 240 provides a function of protecting the light source 300 from external impact while covering the light source 300, or a light guide function that diffuses the light emitted from the light source 300 in the backlight unit 200. The light source protection unit 240 may be made of various materials such as a transparent resin.

A transparent film 250 may be disposed above the light source protection unit 240, and a plurality of light blocking patterns 260 may be disposed above or below the transparent film 250.

The plurality of light blocking patterns 260 may be disposed on the light source protection unit 240 at positions corresponding to the plurality of light sources 300 on the printed circuit 230. In other words, the plurality of light blocking patterns 260 may be disposed at a position corresponding to the light source 300 on the transparent film 250 or may be disposed at a position corresponding to the light source 300 under the transparent film 250. In addition, the plurality of light blocking patterns 260 may be disposed at positions corresponding to the holes 325 in which the plurality of light sources 300 are disposed.

The light blocking pattern 260 may reflect, scatter, or diffract some of the light emitted from the plurality of light sources 300. That is, since the light blocking pattern 260 is disposed in an area having the strongest light intensity, a difference in luminance between an area in which the light source is disposed and an area in which the light source is not disposed may be reduced. The light blocking pattern 260 may be a light diffusion pattern that provides a light diffusion function.

A diffusion plate 280 for diffusing light incident from the bottom may be disposed on the transparent film 250.

An optical sheet 290 having light condensing and light guiding functions may be disposed on the diffusion plate 280.

A color conversion layer 500 that is excited by light emitted from a plurality of light sources 300 and emits light of a long wavelength may be disposed between the reflective layer 400 and the diffusion plate 280. In addition, the color conversion layer 500 includes a first color conversion layer 510 disposed on the reflective layer 400 and a second color conversion layer 520 disposed in a area corresponding to a plurality of light blocking patterns 260 on the transparent film 250 or under the transparent film 250. In addition, the light source protection unit 240 may be disposed on the first color conversion layer 510, and the light source protection unit 240 may be disposed below the second color conversion layer 520.

In other words, the first color conversion layer 510 may be disposed between the reflective layer 400 and the light source protection unit 240, and the second color conversion layer 520 is spaced apart from the first color conversion layer 510 and may be disposed in an area corresponding to the plurality of light blocking patterns 260. Accordingly, the second color conversion layer 520 may be disposed on a substantially vertical line from the light source 300.

The color conversion layer 500 may be, for example, a resin ink layer including a plurality of KSF phosphors. For example, the first color conversion layer 510 may convert a part of light reflected in the direction of the top surface of the reflective layer 400 into light of a different wavelength. For example, when the light source 300 is a blue LED, the first color conversion layer 510 may include a phosphor for converting incident light into red light and green light. The second color conversion layer 520 may include a phosphor for converting incident light into red light and green light. Alternatively, the first color conversion layer 510 may include a phosphor for converting incident light into red light, and the second color conversion layer 520 may include a phosphor for converting incident light into green light. Conversely, the first color conversion layer 510 may include a phosphor for converting incident light into green light, and the second color conversion layer 520 may include a phosphor for converting incident light into red light. Accordingly, the backlight unit 200 may emit white light.

The first color conversion layer 510 may be formed, for example, by patterning a resin including a phosphor on the reflective layer 400. In addition, the second color conversion layer 520 may be formed, for example, by sequentially patterning the light blocking pattern 260 and the second color conversion layer 520 on the transparent film 250. Conversely, after first patterning the second color conversion layer 520 on the transparent film 250, the light blocking pattern 260 may be disposed on the second color conversion layer 520.

In the present disclosure, the first color conversion layer 510 is disposed on the reflective layer 400, and the second color conversion layer 520 is disposed on or below the plurality of light blocking patterns 260, thereby providing the backlight unit 200 capable of increasing color conversion efficiency and supplying white light even without a separate color conversion sheet.

And, since the backlight unit 200 according to the present disclosure includes the color conversion layer 500 and does not include a color conversion sheet, thereby alleviating the problem of light emitted from the plurality of light sources 300 being reflected by the color conversion sheet and out of the local dimming area.

In other words, the backlight unit 200 according to the present disclosure disposes the color conversion layer 500 adjacent to the plurality of light sources 300, thereby alleviating the Halo characteristic with which light is emitted outside the local dimming area.

An adhesive layer 270 is disposed on one surface of the transparent film 250. The adhesive layer 270 may have a function of bonding the transparent film 250 and the light source protection unit 240.

The adhesive layer 270 may be disposed in an area where the plurality of light blocking patterns 260 are not disposed, or may be disposed to cover at least a portion of the plurality of light blocking patterns 260, or completely cover all of the plurality of light blocking patterns 260.

Figure 4:
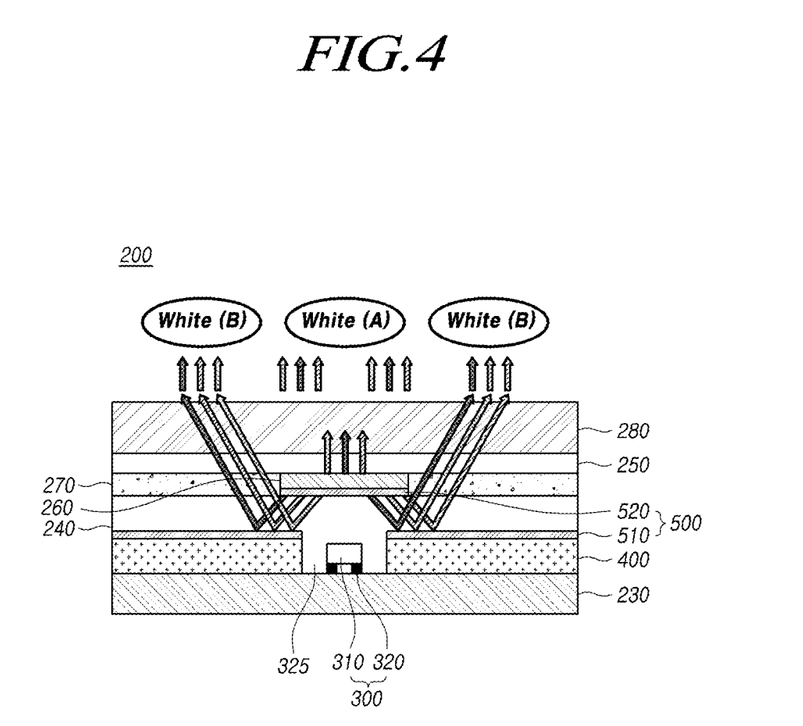
FIG. 4 illustrates a structure in which white light is emitted to a top surface of a backlight unit of FIG. 2.

FIG. 4 illustrates a state in which a backlight unit 200 according to embodiments of the present invention emits white light.

Referring to FIG. 4, the light source 300 emitting blue light is disposed on the printed circuit 230. The light blocking pattern 260 and the second color conversion layer 520 is disposed under the transparent film 250. The first color conversion layer 510 is disposed on the top surface of the reflective layer 400.

Some of the light (A) emitted from the light source 300 may pass through the light blocking pattern 260 and be emitted to the top surface of the backlight unit 200. In addition, some of the rest of the light (B) emitted from the light source 300 may be reflected to the top surface of the reflective layer 400 by the light blocking pattern 260.

Accordingly, some of the light (A) emitted from the light source 300 may be converted in wavelength while passing through the second color conversion layer 520, and the white light may be emitted to the top of the backlight unit 200.

In addition, some of the rest of the light (B) emitted from the light source 300 may be reflected by the light blocking pattern 260 and reflected to the top surface of the reflective layer 400. That is, some of the rest of the light (B) emitted from the light source 300 may be color converted by the second color conversion layer 520 on the bottom surface of the light blocking pattern 260 or the first color conversion layer 510 on the top surface of the reflective layer 400. In other words, some of the rest of the light (B) emitted from the light source 300 may be converted in wavelength by the first color conversion layer 510 or the second color conversion layer 520 so that the top of the backlight unit 200 may emit the white light.

As will be described later, since the first color conversion layer 510 and the second color conversion layer 520 have patterns, it is possible to emit more uniform white light from the top of the backlight unit 200.

Hereinafter, the function and shape of the first color conversion layer 510 will be described in detail with reference to FIGS. 5A to 5C.

Figure 5A:
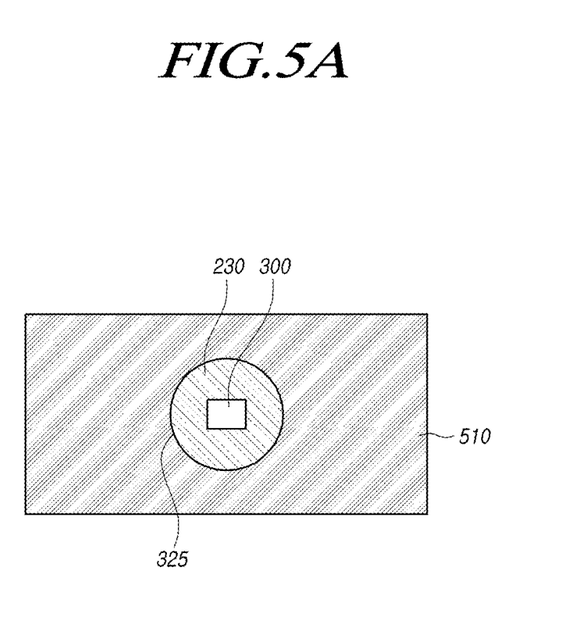
FIGS. 5A to 5C illustrates a first color conversion layer of a backlight unit according to embodiments of the present disclosure.
Figure 5B:
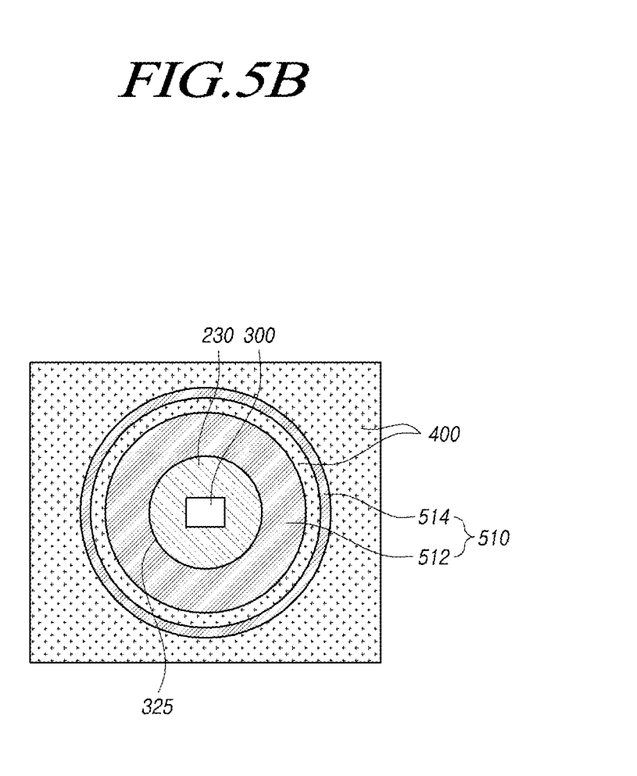
Figure 5C:
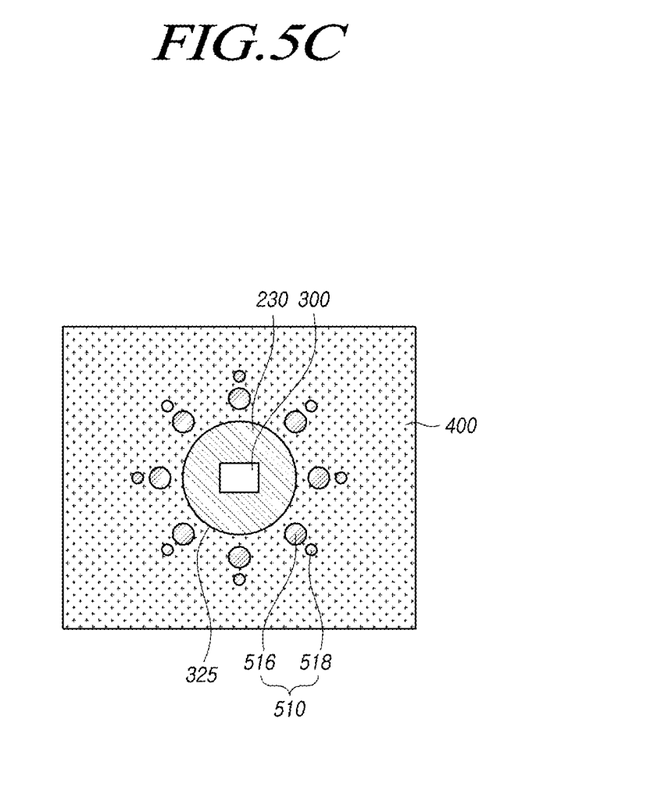

FIGS. 5A to 5C illustrates a first color conversion layer of a backlight unit according to embodiments of the present disclosure.

Referring to FIG. 5A, the first color conversion layer 510 may be disposed in the entire area on the reflective layer 400.

Referring to FIG. 5B, the first color conversion layer 510 may be disposed in a partial area on the reflective layer 400.

When the first color conversion layer 510 is disposed in a partial area on the reflective layer 400, the first color conversion layer 510 may be disposed surrounding the hole 325 in which the plurality of light sources 300 are disposed. In addition, the first color conversion layer 510 may have a pattern, having a large size in an area close to the plurality of light sources 300 and a small size in an area far from the plurality of light sources 300.

When the plurality of light sources 300 are disposed in the circular hole 325, the first color conversion layer 510 may be formed in a ring shape surrounding the hole 325.

In addition, the first color conversion layer 510 may be formed in a pattern including two or more rings 512 and 514 surrounding the circular hole 325. In FIG. 5B, it is shown that the first color conversion layer 510 includes only two rings 512 and 514, but may include three or more rings. In addition, the two or more rings 512 and 514 of the first color conversion layer 510 may have different widths from each other. For example, the width of the first ring 512 close to the hole 325 may be larger than the width of the second ring 514 far from the hole 325.

The first color conversion layer 510 has the effect of supplying uniform white light to the top of the backlight unit 200 by including a pattern in which the width of the first ring 512 close to the hole 325 is larger than the width of the second ring 514 far from the hole 325.

Specifically, the closer to the light source 300, the larger the amount of light reflected by the light blocking pattern 260 and reaching the top surface of the reflective layer 400, so the width of the first ring 512 surrounding the hole 325 may be larger. In addition, the farther from the light source 300, the smaller the amount of light reflected by the light blocking pattern 260 and reaching the top surface of the reflective layer 400, so the width of the second ring 514 surrounding the hole 325 may be smaller.

As the rings 512 and 514 having different widths depending on the distance to the hole 325 is disposed on the reflective layer 400, material cost for the first color conversion layer 510 may be reduced.

In addition, as a portion of the top surface of the reflective layer 400 is exposed between the plurality of rings 512 and 514, a yellowish phenomenon of light emitted to the top of the backlight unit 200 may be alleviated.

Specifically, there may occur the yellowish phenomenon in which most of the blue light emitted from the light source 300 is color converted by the first color conversion layer 510, and yellowish white light is emitted to the top of the backlight unit. In this case, by exposing both the reflective layer 400 between the plurality of rings 512 and 514 of the first color conversion layer 510, and the reflective layer 400 from the outermost ring 514, there may be supplied the white light which matches the ratio of blue light, red light, and green light emitted to the top of the backlight unit 200.

Referring to FIG. 5C, the first color conversion layer 510 may be disposed as a dot pattern in which a plurality of dots extending radially from the hole 325 are included. The dot pattern may include two or more dots 516 and 518 having different sizes, and the size of the dots 516 and 518 may decrease as the distance from the hole 325 increases.

Specifically, the closer to the light source 300, the larger the amount of light reflected by the light blocking pattern 260 and reaching the top surface of the reflective layer 400, so the size of the dot may be larger. In addition, the farther from the light source 300, the smaller the amount of light reflected by the light blocking pattern 260 and reaching the top surface of the reflective layer 400, so the size of the dot may be smaller.

As the dots 516 and 518 having different sizes depending on the distance to the hole 325 are disposed on the reflective layer 400, material cost for the first color conversion layer 510 may be reduced.

In addition, as a portion of the top surface of the reflective layer 400 is exposed between the plurality of dots 516 and 518, a yellowish phenomenon of light emitted to the top of the backlight unit 200 may be alleviated.

The second color conversion layer 520 will be described in detail with reference to FIGS. 6A to 6C.

Figure 6A:
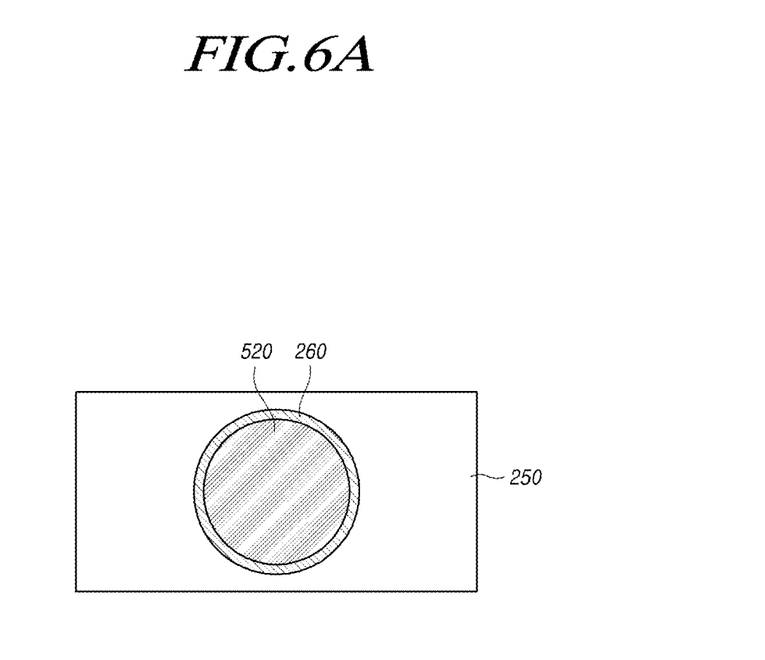
FIGS. 6A to 6C illustrates a second color conversion layer of a backlight unit according to embodiments of the present disclosure.
Figure 6B:
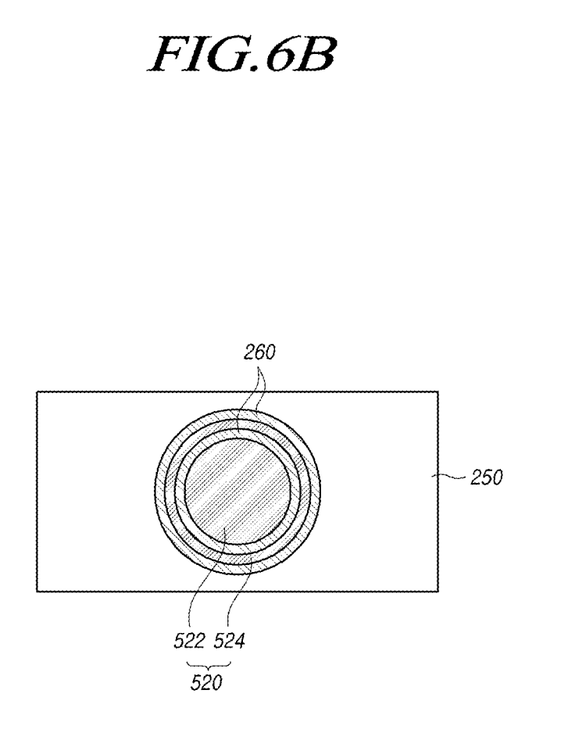
Figure 6C:
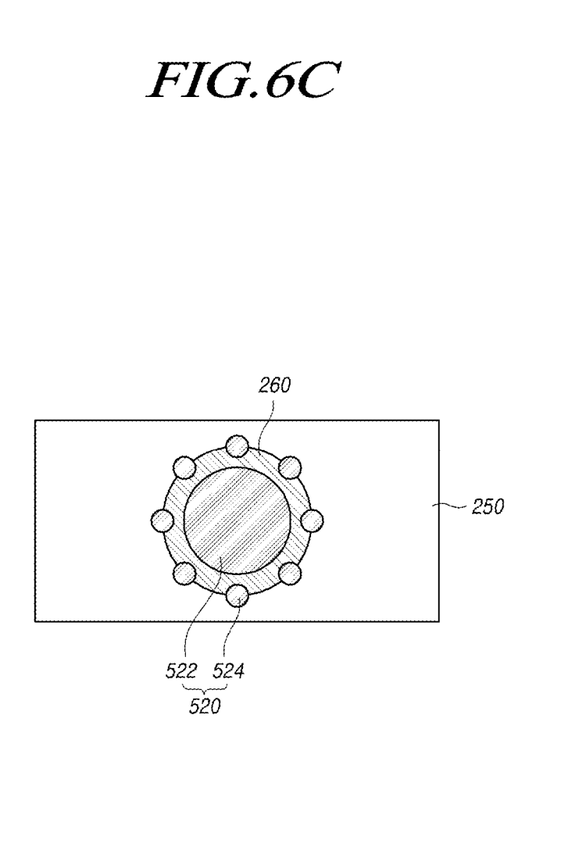

FIGS. 6A to 6C illustrates a second color conversion layer of a backlight unit according to embodiments of the present disclosure.

Referring to FIGS. 2 and 3 again, the second color conversion layer 520 may be disposed on any one of the top or bottom surfaces of the plurality of light blocking patterns 260. The second color conversion layer 520 may be disposed in a region corresponding to the plurality of light blocking patterns 260.

The second color conversion layer 520 may be formed by printing on the light blocking pattern 260, for example, when using resin ink including a plurality of KSF phosphors. The light blocking pattern 260 may be disposed on the transparent film 250, and the second color conversion layer 520 may be disposed on the light blocking pattern 260.

In addition, the second color conversion layer 520 may be formed by printing on the transparent film 250. In addition, the light blocking pattern 260 may be disposed on the second color conversion layer 520. The second color conversion layer 520 may be disposed on the transparent film 250, and the light blocking pattern 260 may be disposed on the second color conversion layer 520.

Referring to FIGS. 6A to 6C, an example in which the light blocking pattern 260 is disposed on the transparent film 250 and the second color conversion layer 520 is disposed on the light blocking pattern 260 is described below. However, the present disclosure is not limited to the above embodiment.

Referring to FIG. 6A, the second color conversion layer 520 may be disposed in the entire area or a partial area of the light blocking pattern 260. When the second color conversion layer 520 is disposed only in the partial area on the light blocking pattern 260, the center of the second color conversion layer 520 and the center of the light blocking pattern 260 may coincide.

The second color conversion layer 520 is disposed on either the top surface or the bottom surface of the light blocking pattern 260, so that the wavelength of a part of the light emitted upward without being reflected by the light blocking pattern 260 may be converted.

Further, since the second color conversion layer 520 is disposed on the bottom surface of the light blocking pattern 260, the wavelength of a part of light reflected by the light blocking pattern 260 may be converted. Accordingly, compared to the case where only the first color conversion layer 510 is disposed on the reflective layer 400, the amount of light whose wavelength is converted may increase.

Referring to FIG. 6B, the second color conversion layer 520 may include a center pattern 522 filled in and a peripheral pattern 524 surrounding the center pattern 522.

The center pattern 522 may be disposed on a substantially vertical line with the light source 300, and may be a circular pattern filled with the inside. Since the center pattern 522 is filled inside, the wavelength of light emitted from the light source 300 on the substantially vertical line may be converted.

In other words, since the amount of light directed directly above the light source 300 is the largest, the center pattern 522 of the second color conversion layer 520 disposed directly above the light source 300 includes a pattern filled with the inside, thereby easily converting color even a large amount of light. As a result, white light may be emitted to the top surface of the backlight unit 200.

That is, according to embodiments of the present disclosure, by having the pattern filled with the inside of the center pattern 522, it is possible to alleviate a phenomenon in which bluish light is emitted to the top surface of the backlight unit 200.

In embodiments of the present disclosure, by forming the peripheral pattern 524 surrounding the center pattern 522, the wavelength of some of the light that passes through the light blocking pattern 260 and emitted to the top surface, and some of the light reflected by the light blocking pattern may be converted.

According to of the present disclosure, by forming the center pattern 522 and the peripheral pattern 524, respectively, it is possible to reduce the material cost required to form the second color conversion layer 520.

In addition, the peripheral pattern 524 may be formed in a ring shape surrounding the center pattern 522 so as to evenly emit white light to the top surface of the backlight unit 200.

Referring to FIG. 6C, the second color conversion layer 520 may include a center pattern 522 filled in and a dot-shaped peripheral pattern 524 surrounding the center pattern 522. The center pattern 522 may be a circular pattern filled with the inside, and the peripheral pattern 524 may be a pattern including a plurality of dots smaller than the size of the center pattern 522. Each dot may be a circular dot filled with the inside.

In this case, each of the plurality of dots of the peripheral pattern 524 may be smaller than the size of the center pattern 522.

Since the peripheral pattern 524 is formed of a plurality of dot patterns surrounding the center pattern 522, white light can be evenly emitted to the top surface of the backlight unit 200.

According to embodiment of the present disclosure, since the color conversion layer 500 may provide the backlight unit 200 that emits high-quality white light without using an expensive color conversion sheet, the manufacturing cost of the backlight unit 200 may be reduced.

Figure 7:
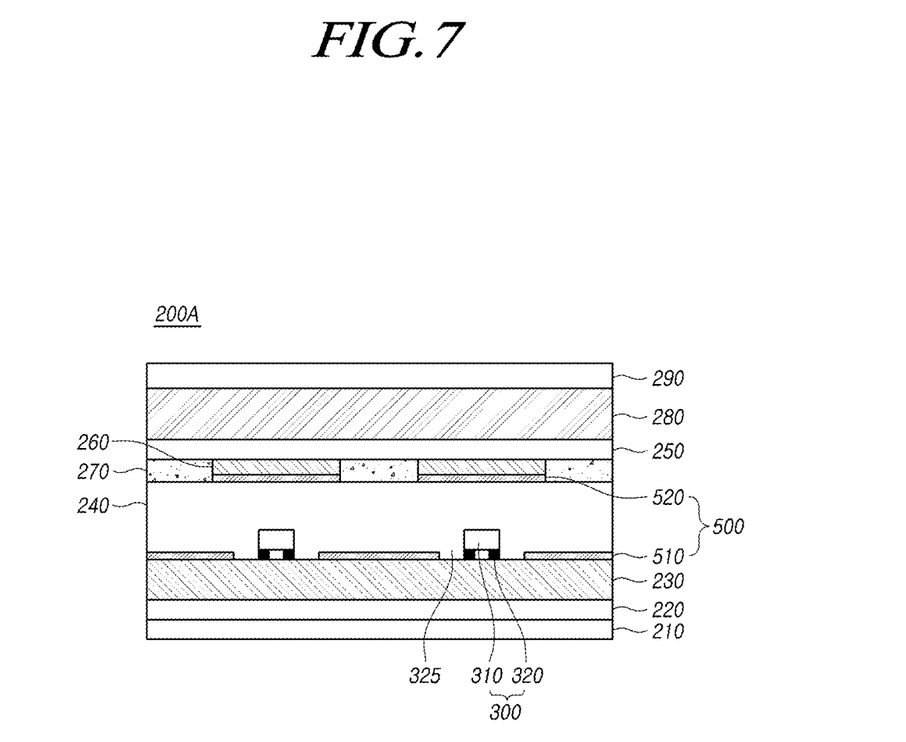
FIG. 7 illustrates another example of a structure of a backlight unit included in the display device according to embodiments of the present disclosure.

FIG. 7 illustrates another example of a structure of a backlight unit included in the display device according to embodiments of the present disclosure.

Referring to FIG. 7, the backlight unit 200A according to embodiments of the present disclosure includes a printed circuit 230, a plurality of light sources 300 disposed on the printed circuit 230, a transparent film 250 disposed above the plurality of light sources 300 and spaced apart from the light sources 300, a plurality of light blocking patterns 260 disposed on at least one of the top and bottom of the transparent film 250 and corresponding to each of the plurality of light sources 300, a first color conversion layer 510 disposed on at least a partial area among an area at which the plurality of light sources 300 are not disposed on the printed circuit 230, and a second color conversion layer 520 disposed on at least one of the top and bottom surfaces of the plurality of light blocking patterns 260.

The first color conversion layer 510 may be directly disposed on the printed circuit 230. In this case, a separate reflective layer may not be interposed between the first color conversion layer 510 and the printed circuit 230.

It will be apparent to those skilled in the art that various modifications and variations can be made in the back light unit and the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A backlight unit, comprising:
a printed circuit;
a plurality of light sources disposed on the printed circuit;
a reflective layer disposed on at least a partial area of an area in which the plurality of light sources are not disposed on the printed circuit;
a transparent film disposed above the plurality of light sources and the reflective layer and spaced apart from the plurality of light sources and the reflective layer;
a plurality of light diffusion patterns disposed on at least one of the top and bottom of the transparent film and corresponding to each of the plurality of light sources;
a first color conversion layer disposed on the reflective layer;
a second color conversion layer disposed on at least one of a top surface and a bottom surface of the plurality of light diffusion patterns; and
wherein each of the plurality of light sources is disposed inside a hole in which the reflective layer is not disposed on the printed circuit,
wherein the first color conversion layer having a pattern surrounding the hole,
wherein the pattern is a radial dot pattern centered on the light source, and
wherein a size of the dot close to the hole is larger than a size of the dot far from the hole.

2. The backlight unit of claim 1, wherein the pattern of the first color conversion layer is a pattern comprising two or more rings surrounding the hole, and
at least a portion of the reflective layer is exposed between the two or more rings, and a width of a ring close to the hole is greater than a width of a ring far from the hole.

3. The backlight unit of claim 1, wherein the second color conversion layer comprises a center pattern filled inside and a peripheral pattern surrounding the center pattern.

4. The backlight unit of claim 3, wherein the peripheral pattern is a ring pattern surrounding the center pattern.

5. The backlight unit of claim 3, wherein the peripheral pattern is a pattern comprising a plurality of dots surrounding the center pattern, and
the size of each of the plurality of dots is smaller than the size of the center pattern.

6. The backlight unit of claim 1, wherein the first color conversion layer comprises: a plurality of phosphors that are excited by light emitted from the plurality of light sources to emit light of different wavelengths; and a resin in which the plurality of phosphors are mixed, and
the first color conversion layer is patterned on the reflective layer.

7. The backlight unit of claim 1, wherein the second color conversion layer comprises: a plurality of phosphors that are excited by light emitted from the plurality of light sources to emit light of different wavelengths; and a resin in which the plurality of phosphors are mixed, and
the second color conversion layer is patterned on at least one of the plurality of light diffusion patterns and a top surface and a bottom surface of the transparent film.

8. A backlight unit comprising:
a printed circuit;
a plurality of light sources disposed on the printed circuit;
a transparent film disposed above the plurality of light sources and spaced apart from the plurality of light sources;
a plurality of light diffusion patterns disposed on at least one of the top and bottom of the transparent film and corresponding to each of the plurality of light sources;
a first color conversion layer disposed on at least a partial area among an area at which the plurality of light sources are not disposed;
a second color conversion layer disposed on at least one of a top surface and a bottom surface of the plurality of light diffusion patterns; and
wherein the backlight unit further comprises a reflective layer disposed on at least a partial area of an area in which the plurality of light sources are not disposed on the printed circuit,
wherein the transparent film is disposed on the reflective layer and spaced apart from the reflective layer, wherein the first color conversion layer is disposed on the reflective layer,
wherein each of the plurality of light sources is disposed inside a hole in which the reflective layer is not disposed on the printed circuit,
wherein the first color conversion layer having a pattern surrounding the hole,
wherein the pattern is a radial dot pattern centered on the light source, and
wherein a size of the dot close to the hole is larger than a size of the dot far from the hole.

9. A display device comprising:
a display panel; and
a backlight unit to supply light to the display panel,
wherein the backlight unit comprises
a printed circuit,
a plurality of light sources disposed on the printed circuit,
a transparent film disposed on the plurality of light sources and spaced apart from the plurality of light sources,
a plurality of light diffusion patterns disposed on at least one of the top and bottom of the transparent film and corresponding to each of the plurality of light sources,
a first color conversion layer disposed on at least a partial area among an area at which the plurality of light sources are not disposed, and
a second color conversion layer disposed on at least one of a top surface and a bottom surface of the plurality of light diffusion patterns,
wherein the backlight unit further comprises a reflective layer disposed on at least a partial area of an area in which the plurality of light sources are not disposed on the printed circuit,
wherein the transparent film is disposed on the reflective layer and spaced apart from the reflective layer,
wherein the first color conversion layer is disposed on the reflective layer,
wherein the second color conversion layer comprises a center pattern filled inside and a peripheral pattern surrounding the center pattern.

10. The display device of claim 9, wherein each of the plurality of light sources is disposed inside a hole in which the reflective layer is not disposed on the printed circuit, and
the first color conversion layer having a pattern surrounding the hole.

11. The display device of claim 10, wherein the pattern of the first color conversion layer is a pattern comprising two or more rings surrounding the hole, and
at least a portion of the reflective layer is exposed between the two or more rings, and a width of a ring close to the hole is greater than a width of a ring far from the hole.

12. The display device of claim 10, wherein the pattern is a radial dot pattern centered on the light source, and
a size of the dot close to the hole is larger than a size of the dot far from the hole.

13. The display device of claim 9, wherein the peripheral pattern is a ring pattern surrounding the center pattern.

14. The display device of claim 9, wherein the peripheral pattern is a pattern comprising a plurality of dots surrounding the center pattern, and
the size of each of the plurality of dots is smaller than the size of the center pattern.

15. The display device of claim 9, wherein the first color conversion layer comprises: a plurality of phosphors that are excited by light emitted from the plurality of light sources to emit light of different wavelengths; and a resin in which the plurality of phosphors are mixed, and
the first color conversion layer is patterned on the reflective layer.

16. The display device of claim 9, wherein the second color conversion layer comprises: a plurality of phosphors that are excited by light emitted from the plurality of light sources to emit light of different wavelengths; and a resin in which the plurality of phosphors are mixed, and
the second color conversion layer is patterned on at least one of the plurality of light diffusion patterns and a top surface and a bottom surface of the transparent film.

* * * * *